United States Patent Office 3,164,061
Patented Jan. 5, 1965

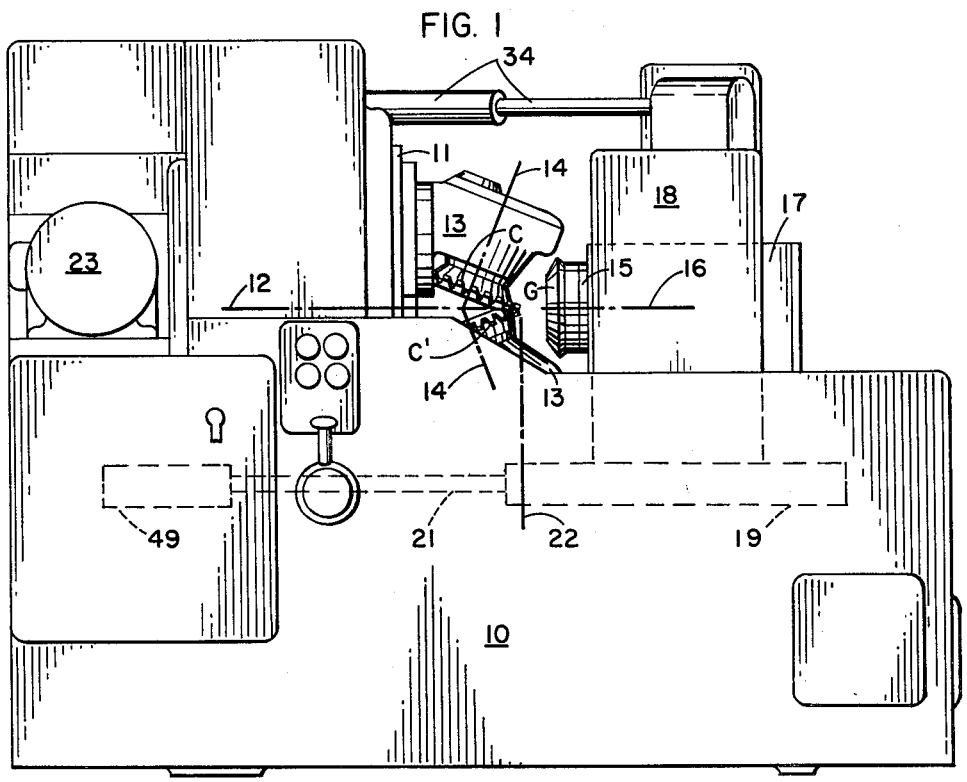
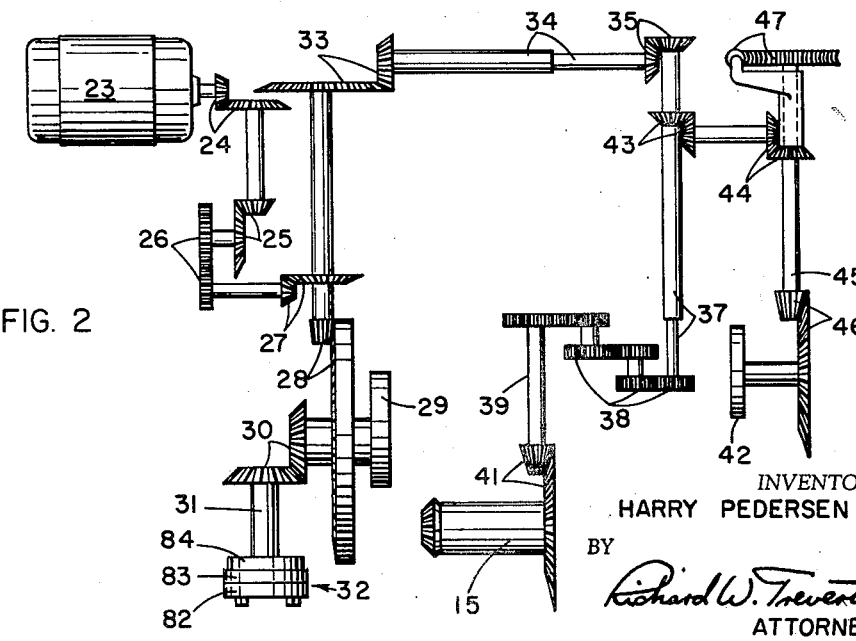

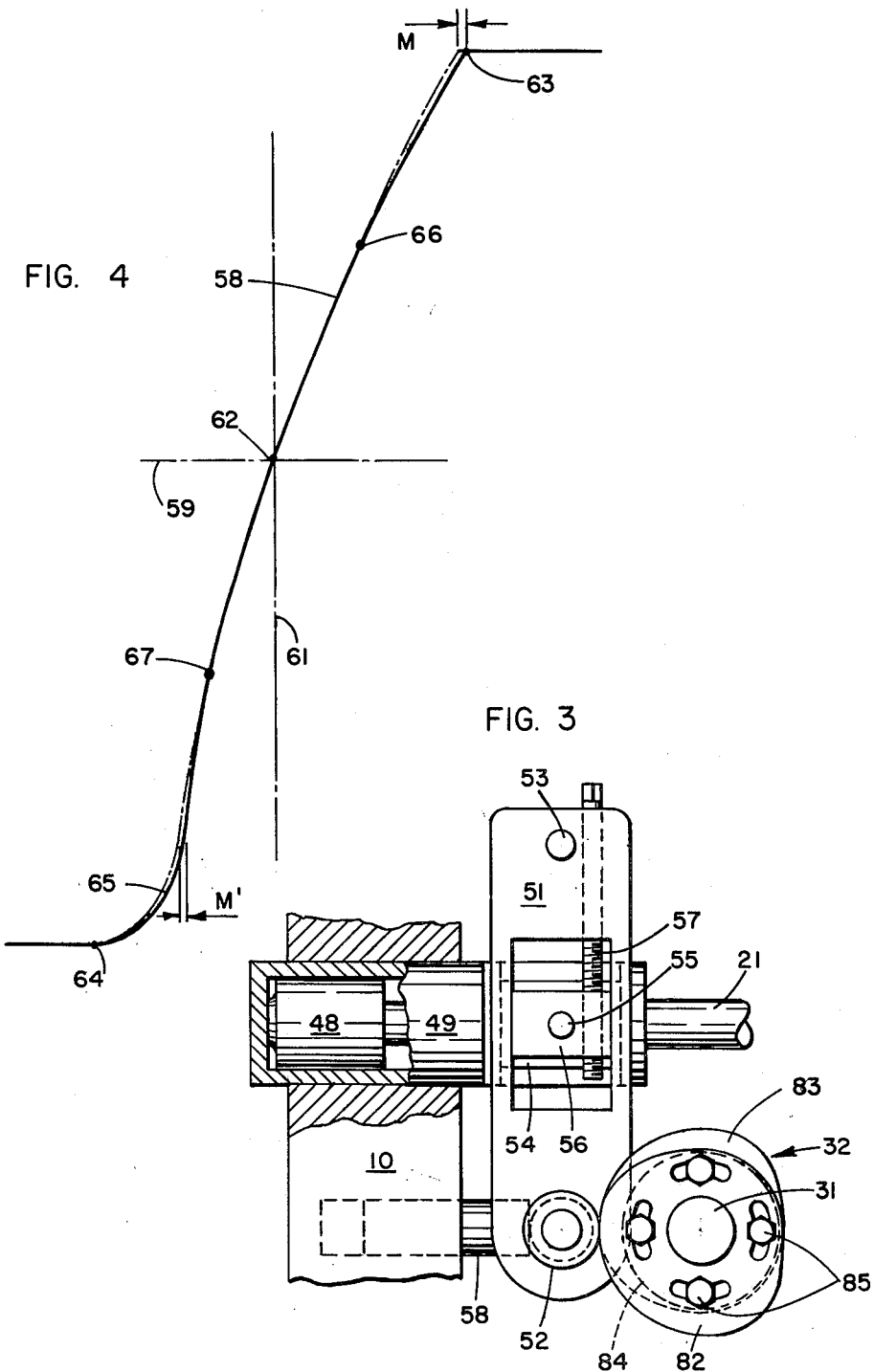

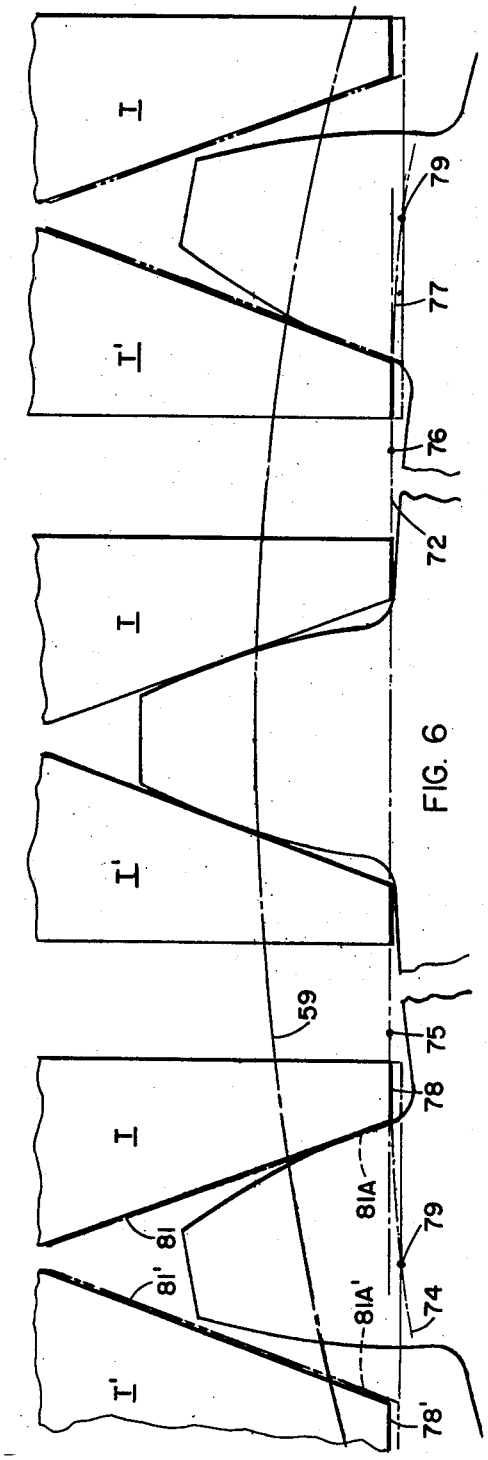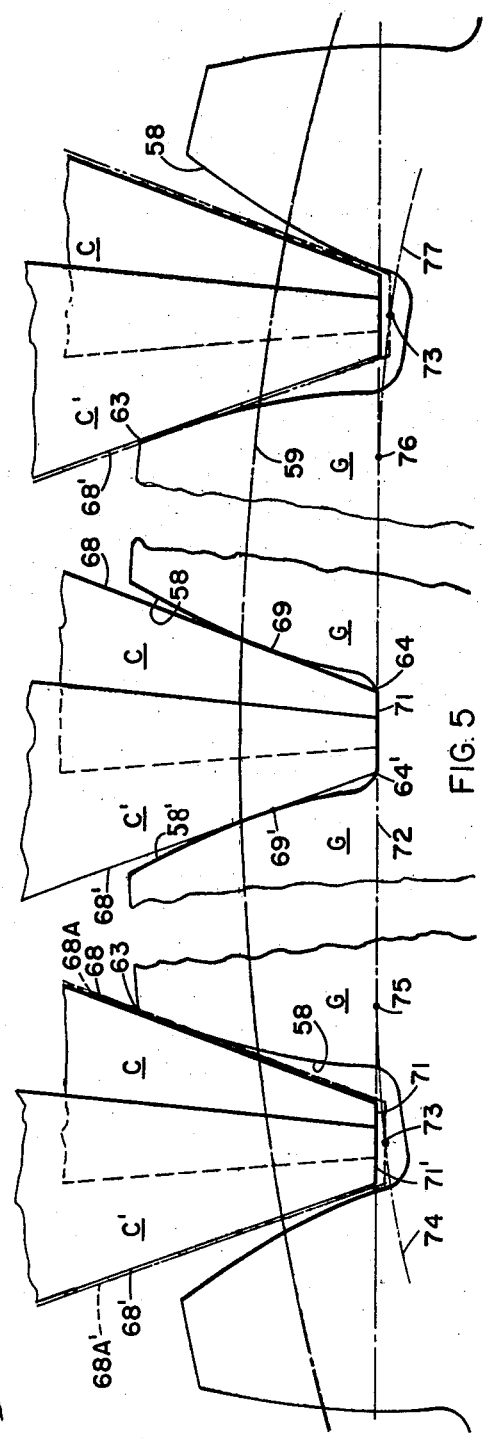

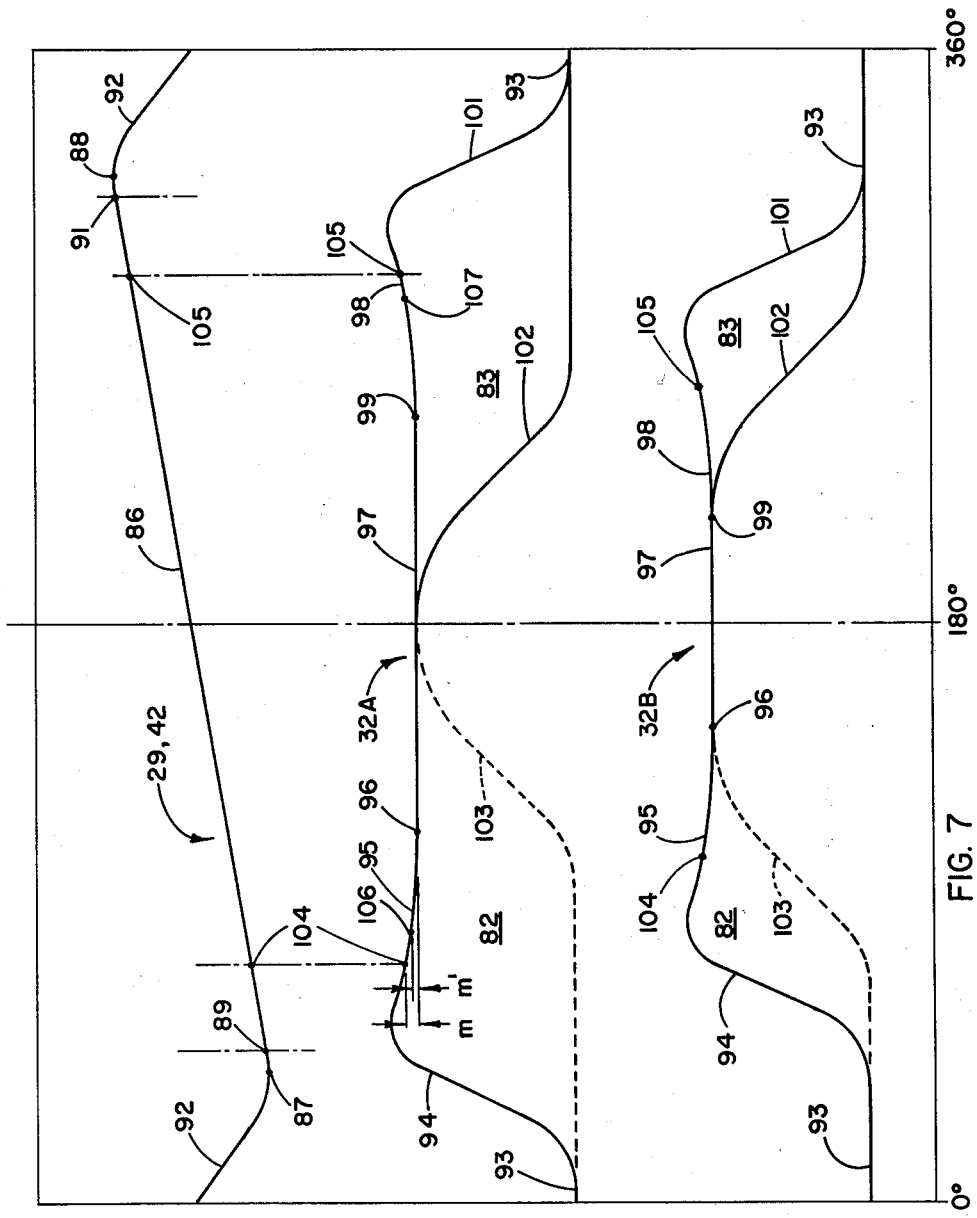

3,164,061
GENERATOR AND METHOD OF GENERATION
FOR SPUR, STRAIGHT BEVEL OR LIKE GEARS
Harry Pedersen, Rochester, N.Y., assignor to The Gleason
Works, Rochester, N.Y., a corporation of New York
Filed Dec. 26, 1962, Ser. No. 247,220
10 Claims. (Cl. 90—3)

The invention relates to generators and a method of generation for gears whose teeth extend substantially in planes containing the gear axis, including spur gears, straight bevel gears, and Zerol gears of large-radius lengthwise tooth curvature, and has particular relation to means and method for modifying the gear tooth profiles to relieve the end portions thereof while generating the middle portions of the profiles to substantially the theoretically correct involute or octoidal shape.

According to the invention a generator for such gears is provided with means to effect a relative withdrawal and advance between the support for the tool means and the rotary support for the work gear, with a dwell between the withdrawal and advance, the withdrawal occurring during the initial phase of generation, while an end portion of the profile of one tooth side is being generated, the advance occurring during the concluding phase of generation, while the corresponding end portion of the profile of an opposite tooth side is being generated, and the dwell extending throughout the middle portion of the generation, while major portions of the opposite tooth sides are being generated.

Preferred embodiments of the invention, arranged for the generation of both spur and straight bevel gears, are shown in the accompanying drawings, wherein:

FIG. 1 is a side elevation of a gear generating machine employing interlocking disc milling cutters;

FIG. 2 is a drive diagram of the machine;

FIG. 3 is a bottom plan view of the feed mechanism of the machine;

FIG. 4 is an enlargement of the profile of a gear tooth generated on the machine;

FIG. 5 is a schematic view illustrating the generation of gear teeth on a machine of the type shown in FIG. 1;

FIG. 6 is a view similar to FIG. 5 illustrating the generating with a machine of another type; and FIG. 7 is a diagram relating the cam-effected feed motion to the generating motion of the machine, and also illustrating the effect of adjustment of the feed cam.

The particular machine shown in FIG. 1 comprises a frame 10 on which a tool support in the form of a cradle 11 is rotatable back and forth about a horizontal axis 12. Mounted on the cradle are cutter heads 13 in which cutter spindles are rotatable on axes 14, the spindles supporting interlocking disc milling cutters C and C' of the general kind disclosed in Patent No. 2,869,427 to L. O. Carlsen et al. The cutter heads are adjustable on the cradle, substantially in the manner disclosed in that patent, to enable the cutters to represent one tooth of a generating gear which rolls in mesh with the work gear during operation of the machine, in accordance with the well known rolling generating process. With this arrangement the cutters operate simultaneously in the same tooth slot, and generate tooth surfaces on opposite sides of the slot. According to another known arrangement, instead of the disc milling cutters C, C' a single cutter of the face mill type may be mounted on the cradle, also for cutting the opposite sides of a tooth slot. In such case the gear teeth are curved from end to end, but their mean spiral or helix angle may be zero. By another well known arrangement, instead of milling cutters the cradle may be arranged to support reciprocating cutting tools positioned to act on opposite sides of the same tooth, as shown for example in L. O. Carlsen Patent No. 2,352,689.

The work gear or gear blank G to be cut is chucked on a work support comprising a spindle 15 rotatable on axis 16 in a work head 17 that is vertically movable on a column 18. The latter is supported by a horizontal slide 19, which is movable along ways on the frame 10 in a direction parallel to cradle axis 12 by actuating means described hereinafter which include actuating rod 21. The column 18 is angularly adjustable on the slide about a vertical axis 22, which intersects axes 12 and 16, to vary the angle between the latter axes. By this adjustment of column 18, adjustment of slide 19 relative to the actuating rod, and adjustment of the vertical position of work head 17 relative to its actuating mechanism, the work head may be brought to a suitable position for supporting spur or bevel gear blanks G of various designs in the proper position for cutting.

The drive of the machine may be as shown in FIG. 2, comprising a motor 23 which through bevel gear pairs 24 and 25, rate-of-generation change gears 26, and bevel gear pairs 27 and 28 drives a generating cam 29 that is arranged to rock the cradle 11 back and forth about axis 12. Through bevel gear pair 30 and shaft 31 the motor also drives a feed cam 32 of the actuating mechanism for slide 19. The transmission mechanism by which the cam 29 rocks the cradle is preferably of adjustable ratio, as disclosed in Patent No. 3,046,799 to J. L. Ash et al., in order that the ratio of roll between the cradle and the work spindle may be adjusted as desired. The motor 23 also drives the work spindle 15, this drive being through aforementioned bevel gears 27, bevel gear pair 33, overhead telescoping shaft 34, bevel gears 35, vertical telescoping shaft 37 rotatable in column 18, and index change gears 38, vertical shaft 39 and bevel gears 41 in work head 17. A generating cam 42, for effecting vertical reciprocation of the work head on column 18, is driven from shaft 37 through bevel gears 43 and 44, shaft 45, and bevel gears 46 in the column. The gearing is such that the cam 32 turns at the same angular velocity as cams 29 and 42. The latter preferably reciprocates the work head by means of a mechanism of the general kind disclosed in Patent No. 2,932,923 to L. O. Carlsen, which is adjustable to vary the magnitude of the vertical motion of the work head. Also, preferably, a fine division mechanism 47 of the worm and wheel or other type is interposed between shaft 45 and the bevel gear 44 thereon to enable small angular adjustments of cam 42. The drive for the cutters C, C', not shown, may be either through gearing from the motor 23 or from a separate motor.

The mechanism for actuating the slide, including cam 32 and rod 21, is shown schematically in FIG. 3. Connected to the rod is a piston 48 in a cylinder 49 that is movable in the frame 10 by a lever 51 actuated by cam 32. The lever carries cam follower roller 52 and is fulcrumed to the frame 10 at 53, and its effective length is adjustable to vary the stroke of the cylinder 49 in the frame. For this purpose a block 54, slidable in a transverse guide groove in the cylinder, is pivoted by pin 55 to a block 56 that is adjustable lengthwise of the lever by means of a screw 57. A hydraulically pressed plunger 58 acts against another roller on the lever to hold follower roller 52 against the cam. During the cutting of a gear the piston is held by hydraulic pressure in its left limit position in the cylinder shown in FIG. 3, and the rotation of hte cam 32 alternately moves the cylinder, piston and rod 21, as a unit, to the left and to the right, to move the work-carrying slide 19 between work cutting and work indexing positions. After cutting of a gear is completed, and while cam 32 is stopped, the piston is hydraulically moved to the right, to withdraw the slide 19 and thereby retract the work spindle to a loading-unloading position well clear of the cutters.

For generating spur gears the column 18 is adjusted to place the work spindle axis 16 at right angles to the cradle axis 12, the generating cam 29 is removed, or the mechanism driven by it otherwise disabled, and the cradle 11 is locked to the frame. During one stroke of each vertical reciprocation of the work head by generating cam 42, preferably the upward stroke, the cam 32 brings the slide 19 into its forward or cutting position, so that the rotating work gear may roll on the cutters as a gear would roll on a tooth of a generating member in the form of a stationary rack. During the downward return stroke of the work head the cam 32 holds the slide retracted, so that the cutters are clear of the work gear, and the latter by its continuing rotation is indexed to bring a successive tooth space thereof into position for cutting when, during the next up stroke of the work head, the cam 32 advances it into engagement with the cutters.

For generating bevel gears in the conventional manner the column 18 is adjusted to bring the work spindle to the desired angularity to the cradle axis. In the usual case the generating cam 42 is removed or the drive by it otherwise disrupted, and the work head is locked to the column. The cradle is oscillated by the generating cam 29, the cam 32, as in the case of spur gears, bringing the work gear into engagement with the cutters during one stroke, i.e. one rolling stroke of the cradle, and disengaging it from the cutters during the return rolling stroke in which the work gear is indexed by its continuing rotation. During generation the work gear rolls against the cutters as it would against a tooth of a generating member in the form of a crown gear.

For generating long-cone-distance bevel gears, by the method of Patent No. 2,824,498 to M. L. Baxter et al., the work head is moved vertically in time with rotation of the cradle, and for this purpose both generating cams 29 and 42 are made operable.

By the present invention, which is applicable to all three of the aforementioned methods, an additional relative motion between the cutters and the work gear is imparted, preferably in the direction of the cradle axis, for the purpose of modifying the tooth profiles of the gear. Referring to FIG. 4, the tooth profile is designated 58 and the pitch circle 59. The pitch point, where the profile and pitch circle intersect radial line 61, is designated 62. The top and bottom points of the profile are 63 and 64, respectively, the latter point being at the juncture of the tooth bottom and the root fillet 65. The middle portion of the profile, 66–67, which constitutes the major part of the working portion of the profile is of substantially theoretically correct involute or octoidal form, whereas the outer portion of the addendum 63–66, or the inner portion 64–67, or both of these portions, are relieved so as to depart gradually and slightly from the theoretically correct shape which is shown by broken lines. This relief prevents the tooth bearing between mating teeth from extending to the addendum edge of the teeth, and causes the teeth to come gradually into and out of mesh, thereby improving the running quality of the gears. By reason of the working mid-portion 66–67 of the profile being of substantially the theoretically correct shape, the gear pair may transmit motion in constant velocity ratio. To this end the gears are preferably so designed that at any instant of rotation the point of contact of the mating profiles of at least one pair of teeth is along this mid-portion 66–67 of both profiles. Provided that the teeth of both members of a pair of gears are relieved, the same advantageous effect is obtained whether the relief is applied to outer portion 66–63, or to the inner portion 67–64, or to both.

FIG. 5 shows the relation between the cutters C, C' and the gear G (whose teeth are shown in their finished condition) in three successive phases of generation, the position of the cutters C and C' being shown in full lines for conventional generation and in broken lines for generation with the mechanism of the present invention by which the profile relief is obtained. At the beginning of generation, shown in the left portion of the view, in conventional cutting a side cutting edge 68 of cutter C is tangent to the tooth profile at top point 63. The center of the view shows the mid-phase of generation in which the edge 68 is tangent to profile 58 at point 69, somewhat inside of the pitch circle 59, while the point of cutter C is at bottom point 64 of the tooth profile. Simultaneously the side edge 68' of cutter C' is tangent to the profile 58' of the opposite side of the tooth slot at corresponding point 69', and the point of the cutter is at the lowest point 64' of the fillet profile. The tip edges 71, 71' of the cutters cut the bottom of the tooth slot in this position. In the right portion of the view the generation of profile 58 has been completed and the cutting edge 68' is concluding its generation of profile 58', being tangent to this profile at addendum point 63. Throughout conventional generation the depthwise position of the cutters remains constant, this being indicated in the drawings by the tip edges 71, 71' following along straight line 72.

With the present invention the cutters are brought to greater depth relative to the work gear at the beginning and at the end of the generation. During the forepart of generation the center point 73 of the cutter tip edges 71, 71' (in their broken line position) traverses a curved path 74 which is tangent to line 72 at point 75. Center point 73 then follows path 72 to point 76 from which it follows the tangent curve 77 until the conclusion of the generation. As a result the side cutting edges 68 and 68' are respectively displaced to the dotted line position 68A and 68A' in the initial and terminal stages of generation, but are in the same positions as in conventional generation between points 75 and 76, which correspond respectively with points 66 and 67 of FIG. 4.

When the machine is provided with a face mill cutter instead of disc milling cutters C, C', substantially the same effect shown in FIG. 5 is obtained. In this case the elements designated C and C' in this view, with cutting edges 68 and 68', may be considered to represent inside and outside cutting blades of a face mill cutter.

With the particular disposition of the generating pitch circle 59 shown in FIG. 5, wherein the addendum and dedendum are substantially equal, the tooth profile relief will occur either entirely or for the greater part at the addendum portions 63–66. With other conditions being equal, increase or decrease in the ratio of addendum to dedendum will tend respectively to increase or decrease the relief at the addendum, and respectively increase or decrease it at the dedendum.

Also the conditions are different when the cutting edges of the tool means on the cradle generate opposite sides of the same tooth as shown in FIG. 6, rather than opposite tooth sides of the same tooth slot as shown in FIG. 5. FIG. 6 illustrates such a case, where tools T, T' are arranged for reciprocation on the cradle instead of the disc cutters C, C' shown in FIG. 5. In conventional generation these tools T, T' remain at constant depth, their tip edges 78, 78' traversing path 72. With the present invention these edges cut to the greater depth shown in broken lines in the left and right portion of FIG. 6, their center point 79 traversing curved path 74 to tangent point 75, then following along path 72 to tangent point 76, and then following curved path 77. Under the conditions shown, the profile relief, caused by displacement of the side cutting edges 81 and 81' to the broken line positions 81A and 81A' in the initial and terminal phases of generation, occurs either entirely or for the greater part at the dedendum portion 64–67 of the profile. In this case also the disposition of the relief may be varied by change of radius of the generating pitch circle 59.

The extent of the relief along the tooth profile and also the magnitude of the relief, i.e. the distance M or M', FIG. 4, may be varied by adjustment of the machine, including adjustment of the cam 32 which effects the depthwise variation between the work gear and the tool means shown in FIGS. 5 and 6. To enable its adjustment the cam comprises two discs 82 and 83, both of which are engageable with the cam follower roller 52. The discs are secured to a flange 84 on shaft 31 by screws 85 which extend through arcuate slots in the discs. Upon loosening of these screws the discs may be adjusted angularly about the shaft relative to each other and also to the shaft. To facilitate such adjustment, suitable scales, not shown, may be provided on the discs and the flange. The cam is shown diagrammatically in FIG. 7 at 32A in one condition of adjustment, and at 32B in another such condition.

FIG. 7 also illustrates the phase relation between cam 32 and the generating cam 29 or 42. The section 86 of this cam between reversal points 87 and 88 produces the generating roll of cradle 11 or the generating stroke of the work head 17, the motion produced by the part of this section between points 89 and 91 being in constant velocity ratio to rotation of the work spindle. The remaining section 92 of the generating cam produces the return roll of the cradle or return stroke of the work head.

Referring to the feed cam 32 as shown at 32A, there is a dwell 93 which is effective at the mid-portion of the return cradle roll or work head stroke, an infeed section 94 to advance the slide 19 to full cutting depth, a withdrawal section 95 which at point 96 merges tangentially into a dwell 97 which is effective while the mid-portions 66–67 of the tooth profiles are being generated, an infeed section 98 which departs tangentially from dwell 97 at point 99, and a withdrawal section 101 extending to dwell 93. The relieved portions of the tooth profiles are generated while the withdrawal section 95 and infeed section 98 are effective. The periphery of cam disc 82 contains part of dwell 93, all of infeed section 94 and withdrawal section 95, part of dwell 97, and an inactive section 102, which does not contact the follower roller and which extends between dwell sections 97 and 93. Similarly the periphery of cam disc 83 contains part of dwell 97, all of advance section 98 and withdrawal section 101, part of dwell 93, and an inactive section 103 extending between dwell sections 93 and 97.

By adjustment of discs 82 and 83, respectively clockwise and counterclockwise in FIG. 3, upon the flange 84, they may be brought to the condition shown at 32B in FIG. 7, with the result that the effective length of dwell 97 is reduced and that of dwell 93 increased. The dwell sections 93 and 97 of the two discs overlap in all permissible positions of adjustment, so that there is no discontinuity of the cam surface that is contacted by the follower roller 52. The adjustment may be employed to vary the extent of the portion of the tooth profile that is relieved relative to the extent of the unrelieved portion. Thus in the cam adjustment condition shown at 32A, if tooth profile generation begins at point 104 and ends at point 105, the unrelieved portion will be of substantially smaller extent than in condition 32B, due to the ratio of dimension 104–96 (and 99–105) to dimension 96–99 being smaller in condition 32A than in 32B. The relative extents of the relieved and unrelieved portions of the tooth profiles is also varied by changing the angle of cam rotation that is utilized for generation. Thus if generation begins and ends respectively at points 106 and 107, instead of at 104 and 105, the relative extent of the relief will be reduced. This also reduces from $m$ to $m'$ the motion imparted by cam 32 to the cam follower roller 52. However, the magnitude or degree of the relief, M or M', in FIG. 4, may be brought to a suitable value by adjustment of the effective length of lever 51, as has been explained in connection with FIG. 3. Accordingly both the extent and degree of the profile relief may be readily adjusted to suit the requirements of the particular gears being generated. Furthermore, by adjusting both discs 82 and 83 in the same direction upon the flange 84, the phase relation between cam 32 and generating cam 29 or 42 is changed, to thereby shift path 32A or 32B to the right or to the left in FIG. 7 relative to the path 29, 42. This may be utilized for either balancing or unbalancing the amounts of profile relief on opposite sides of the teeth. It will be understood that the magnitude of the dimensions M, M', $m$ and $m'$ are greatly exaggerated in the drawings, in practice usually being only on the order of a fraction of one-thousandth to a few thousandths of an inch.

Having now described preferred embodiments of my invention, and their operation and effect, what I claim is:

1. A generator for a gear whose teeth extend substantially in planes containing the gear axis, comprising a tool support upon which tool means are mounted for cutting motion on opposite tooth sides and a work support rotatable about said axis, said supports being mounted for relative generating motion, including a rotation about said axis, to roll a gear on the work support upon said tool means which represent tooth surfaces of a generating member, said supports also being mounted for relative advance and withdrawal in a direction approximately depthwise of a gear tooth at a mean point of generation, actuating means for effecting said generating motion and, in time therewith, effecting said relative advance and withdrawal, said actuating means being arranged to effect the relative withdrawal during the initial phase of the generation, while an end portion of the profile of one tooth side is being generated, and to effect the relative advance during the concluding phase of the generation, while the corresponding end portion of the profile of the opposite tooth side is being generated, and to maintain said supports against relative motion in said depthwise direction throughout the middle portion of the generation occurring between said withdrawal and advance, while major portions of the opposite tooth sides are being generated.

2. A generator according to claim 1 in which said actuating means comprise a power operated drive train connecting said supports for generating motion and a cam for effecting said relative advance and withdrawal, said cam having a dwell to maintain said supports against relative motion during the period between said advance and withdrawal.

3. A generator according to claim 2 in which said actuating means include means to adjust the phase relation between said cam and the drive train, whereby the mean point of the dwell may be adjusted relative to the mid-point of generation.

4. A generator according to claim 2 in which said cam comprises at least two relatively adjustable sections, whereby the length of the dwell may be adjusted.

5. A generator according to claim 2 in which there is a ratio-adjusting means for the motion imparted by the cam, whereby the magnitude of said relative advance and withdrawal of said supports may be adjusted.

6. A generator according to claim 2 in which one of said supports is mounted on a rotary cradle whose rotation axis constitutes the axis of said generating member, the latter being substantially in the form of a crown gear, one of said supports is mounted on a slide movable in a path substantially parallel to said rotation axis, said drive train connects said cradle and the work support for rotations about their respective axes, and said cam is arranged to act upon the slide for effecting said advance and withdrawal, and for said maintenance of said supports against relative motion.

7. A generator according to claim 2 in which one of said supports is mounted on a first slide which is movable in a path parallel to said generating member, the latter being in the form of a rack, one of said supports is mounted on a second slide movable substantially perpendicularly to the face plane of said generating member, said drive train connects the first slide and the work support for rectilinear motion and rotation, respectively, and said cam is arranged to act upon the second slide for effecting said advance and withdrawal, and for said maintenance of said supports against relative motion.

8. The method of generating a gear whose teeth extend substantially in planes containing the gear axis, by effecting a relative rolling generating motion between a work gear and tool means ararnged to simultaneously cut opposite tooth sides of the gear, the gear during said generating motion being rolled upon said tool means as it would upon tooth surfaces of a generating member which the tool means represent, comprising a relative withdrawal and advance between the gear and said tool means, in a direction approximately depthwise of a gear tooth at a mean point of generation, said withdrawal being effected during the initial phase of the generation, while an end portion of the profile of one tooth side is being generated, and said advance being effected during the concluding phase of the generation, while the corresponding end portion of the profile of the opposite tooth side is being generated, the gear and said tool means being held against relative motion in said depthwise direction throughout the middle portion of generation occurring between said withdrawal and advance, while major portions of the opposite tooth sides are being generated.

9. The method of claim 8 in which said generating member is substaintially in the form of a crown gear, said rolling generating motion comprises a rotation of the work gear about its axis, and, coordinated therewith, a relative rotation between the work gear and the tool means about the axis of said generating gear, and said relative withdrawal and advance are substantially in the direction of the last-mentioned axis.

10. The method of claim 9 in which said generating member is substantially in the form of a rack, said rolling generating motion comprises a rotation of the work gear about its axis, and, coordinated therewith, a relative translation between the work gear and the tool means in a direction lengthwise of said rack, and the direction of said relative withdrawal and advance is substantially perpendicular to both said axis and the direction of said translation.

References Cited in the file of this patent

UNITED STATES PATENTS

| | | |
|---|---|---|
| 1,584,310 | McCarvey | May 11, 1926 |
| 2,660,930 | De Veieg et al. | Dec. 1, 1953 |
| 2,869,427 | Carlsen et al. | Jan. 20, 1959 |
| 2,895,384 | Baxter et al. | July 21, 1959 |
| 2,895,385 | Carlsen | July 21, 1959 |
| 2,913,962 | Carlsen et al. | Nov. 24, 1959 |
| 2,932,923 | Carlsen | Apr. 19, 1960 |